S. COTTLE.
Chains for Necklaces, &c.

No. 147,045.  Patented Feb. 3, 1874.

Witnesses:  Inventor:

UNITED STATES PATENT OFFICE.

SHUBAEL COTTLE, OF NEW YORK, N. Y., ASSIGNOR TO MULFORD, HALE & COTTLE, OF SAME PLACE.

IMPROVEMENT IN CHAINS FOR NECKLACES, &c.

Specification forming part of Letters Patent No. 147,045, dated February 3, 1874; application filed January 10, 1874.

*To all whom it may concern:*

Figure 1:
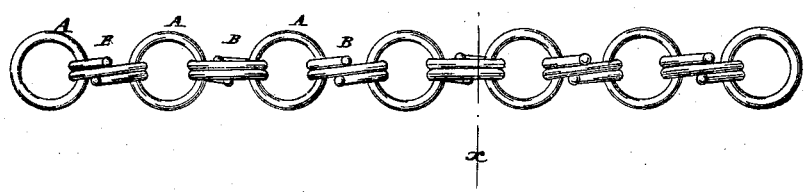
Figure 2:
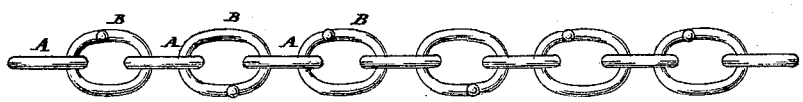
Figure 3:
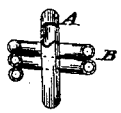

Be it known that I, SHUBAEL COTTLE, of the city, county, and State of New York, have invented a new and useful Improvement in Chain Necklaces, of which the following is a specification:

Figure 1 is a side view of a portion of my improved chain for necklaces, &c. Fig. 2 is a view of the same turned one-quarter around; and Fig. 3 is a cross-section of the same, taken through the line $x\ x$, Fig. 1.

My invention has for its object to furnish a chain for necklaces, &c., formed of the usual round closed links and open spiral links of peculiar construction, alternately arranged, each alternate link being polished or colored, and which shall be so constructed that the links may all be finished separate and then put together to form the chain, thus avoiding the necessity of coloring the whole chain, and then polishing the alternate links, which is very laborious, and makes the article very expensive. The invention consists in a chain for necklaces formed of alternate closed links and open spiral links, as hereinafter more fully described.

A and B represent the links of the chain. The links A are round and close, as shown in Fig. 1, and are made and polished separate from the other links. The links B are formed by two or more coils of tubing of the proper length, so as to form a double-spring link. Into each end of the tube forming the link B is soldered a small shot, as shown in the drawing, which shot gives a finish to the link. The links B are then colored, and the chain is formed by springing the links A into the links B, so that they may alternate with each other. The links A B may be made, the one kind round and the other oval, or both kinds may be made round. The first construction is preferred, as producing a more elegant chain. Either kind of links A B may be polished and the other colored; but I prefer to polish the closed links and color the open spiral ones, as producing a more pleasing effect.

By this kind of construction, each kind of link may be made and finished in quantities, and the chain formed from the finished links by springing the closed links into the open spiral ones until a necklace of the required length is formed.

Having thus described my invention, I claim as new and desire to secure by Letters Patent—

An ornamental chain for chain necklaces, &c., formed of alternate closed links A and open spiral links B, when constructed substantially as herein described and shown.

SHUBAEL COTTLE.

Witnesses:
JAMES T. GRAHAM,
T. B. MOSHER.